United States Patent
Chang et al.

(10) Patent No.: US 9,412,164 B2
(45) Date of Patent: Aug. 9, 2016

(54) APPARATUS AND METHODS FOR IMAGING SYSTEM CALIBRATION

(75) Inventors: Nelson Liang An Chang, San Jose, CA (US); Suk Hwan Lim, Mountain View, CA (US); Feng Tang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 800 days.

(21) Appl. No.: 12/787,329

(22) Filed: May 25, 2010

(65) Prior Publication Data

US 2011/0292219 A1    Dec. 1, 2011

(51) Int. Cl.
 *H04N 17/02* (2006.01)
 *H04N 17/00* (2006.01)
 *G06T 7/00* (2006.01)

(52) U.S. Cl.
 CPC ..... *G06T 7/0018* (2013.01); *G06T 2207/30208* (2013.01)

(58) Field of Classification Search
 CPC ............................. H04N 17/00; H04N 17/02
 USPC .......... 348/187, 188, 189, 181, 182, 180, 241
 See application file for complete search history.

(56) References Cited

U.S. PATENT DOCUMENTS

| | | | |
|---|---|---|---|
| 6,437,823 B1 | 8/2002 | Zhang | |
| 7,262,797 B2 | 8/2007 | Weldum et al. | |
| 7,612,801 B2 * | 11/2009 | Pierce | 348/188 |
| 7,671,891 B2 * | 3/2010 | Fitzgibbon et al. | 348/188 |
| 7,889,234 B2 * | 2/2011 | Williams et al. | 348/188 |
| 2003/0048357 A1 | 3/2003 | Kain et al. | |
| 2006/0221072 A1 | 10/2006 | Se et al. | |
| 2007/0196016 A1 | 8/2007 | Chen et al. | |
| 2008/0291282 A1 | 11/2008 | Fitzgibbon et al. | |
| 2009/0180008 A1 | 7/2009 | Williams et al. | |
| 2009/0296984 A1 | 12/2009 | Nijim et al. | |

FOREIGN PATENT DOCUMENTS

WO     2005025237     3/2005

OTHER PUBLICATIONS

Marta Wilczkowiak et al., Camera Calibration and 3D Reconstruction from Single Images Using Parallelpipeds, Eighth International Conference on Computer Vision (ICCV'01), 2001, p. 142, vol. 1., IEEE Computer Society, Vancouver, B.C., Canada.

(Continued)

*Primary Examiner* — Trang U Tran
(74) *Attorney, Agent, or Firm* — HP Inc Patent Department

(57) ABSTRACT

A reference set of image features is determined from an electronic data file specifying a reference image in a reference coordinate space. Rendering information describing a physical rendering of the reference image is ascertained. Calibration-enabling data is derived from the reference set of the image features and the ascertained rendering information. The calibration-enabling data is provided to calibrate an imaging system. The calibration-enabling data may be stored. The imaging system may capture an image of the physical rendering of the reference image in relation to a capture coordinate space. An extracted set of image features may be extracted from the captured image. Respective ones of the image features in the reference and extracted sets may be matched. The imaging system may be calibrated based on matched ones of the image features and the rendering information.

20 Claims, 5 Drawing Sheets

(56) References Cited

OTHER PUBLICATIONS

Arne Henrichsen, 3D Reconstruction and Camera Calibration from 2D Images, Ph.D. thesis, Dec. 2000, University of Cape Town, Department of Electrical Engineering, Cape Town, South Africa.

Wen Chen et al., "Computer Graphics Identification Using Genetic Algorithm," IEEE International Conference on Pattern Recognition (ICPR08), Tampa, Florida, USA, Dec. 2008.

Rushmeier H., Ward G., Piatko C., Sanders E, Rust B., "Comparing Real and Synthetic Images: Some Ideas About Metrics," Proceedings of Sixth Eurographics Workshop on Rendering, Dublin, Ireland, 1995, pp. 82-91.

Tian-tsong Ng et al, "Physics-motivated features for distinguishing photographic images and computer graphics," ACM Multimedia Singapore, Nov. 2005.

Belongie et al., Shape Matching and Object Recognition Using Shape Contexts, IEEE Transactions on Pattern Analysis and Machine Intelligence, vol. 24(4), pp. 509-522 (2002) (14 pages).

Hartley et al., Multiple View Geometry in Computer Vision, Second Edition, Cambridge University Press, 2003 (673 pages).

Mikolajczyk et al., a Comparison of Affine Region Detectors, International Journal of Computer Vision (IJCV), 2005 (36 pages).

Tang et al., A Novel Feature Descriptor Invariant to Complex Brightness Changes, IEEE 2009 (8 pages).

* cited by examiner

APPARATUS AND METHODS FOR IMAGING SYSTEM CALIBRATION

BACKGROUND

Cameras often have non-idealities (e.g., lens distortion, rectangular sensor sizes, and a non-centered optical axis). For many camera-based operations, it is important to be able to calibrate and compensate for these non-idealities to have an accurate mathematical model of the image formation process. This process typically involves estimating the intrinsic camera parameters, such as focal length, aspect ratio of the individual sensors, the skew of the capture plane, and radial lens distortion. In addition, estimates of extrinsic parameters (e.g., the relative positions and orientations of each camera) and spectral/chromatic variations across cameras typically are needed when multiple cameras are used to capture a scene for three-dimensional (3-D) capture.

So-called "strong calibration" involves determining the mathematical relationship between image pixels in any camera to true 3-D coordinates with respect to some world origin. This process typically involves identifying robust and stable features of a known scene (e.g., a checkerboard pattern) with corresponding world coordinate information. The correspondence information then is fed into a nonlinear optimization process that solves for the intrinsic parameters and the extrinsic parameters. A less constrained ("weak") calibration can be done if the epipolar geometry is to be solved between pairs of cameras. In this process, feature correspondences again are used, but no associated world coordinate information is necessary. These feature correspondences may be used in a non-linear optimization process to solve for the fundamental matrix that contains geometric information that relates two different viewpoints of the same scene.

DETAILED DESCRIPTION

Figure 1:
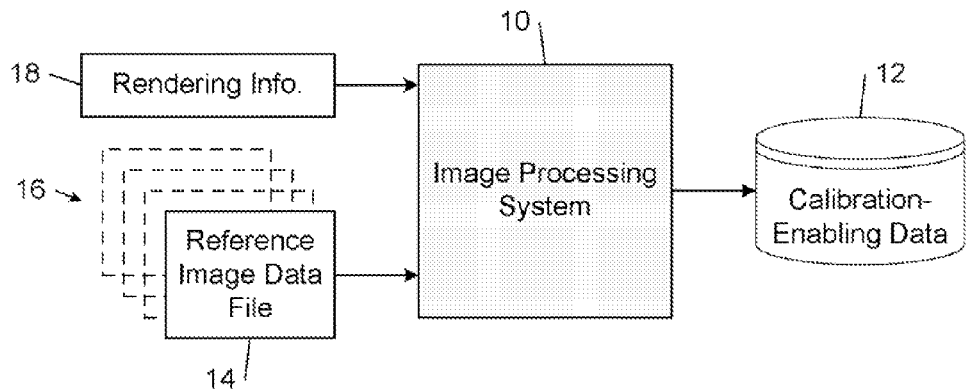
FIG. 1 is a block diagram of an example of an image processing system producing camera calibration-enabling data based on a reference image and rendering information.

In the following description, like reference numbers are used to identify like elements. Furthermore, the drawings are intended to illustrate features of various examples in a diagrammatic manner. The drawings are not intended to depict every feature of actual embodiments nor relative dimensions of the depicted elements, and are not drawn to scale.

An "image" broadly refers to any type of visually perceptible content that may be rendered on a physical medium (e.g., a display monitor or a print medium). Images may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

The term "image forming element" refers to an addressable region of an image. In some examples, the image forming elements correspond to pixels, which are the smallest addressable units of an image. Each image forming element has at least one respective "image value" that is represented by one or more bits. For example, an image forming element in the RGB color space includes a respective image value for each of the colors red, green, and blue, where each of the image values may be represented by one or more bits.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information that is readable by a machine (e.g., a computer). Storage devices suitable for tangibly embodying these instructions and data include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on.

Following is a description of apparatus and methods for camera calibration. The examples that are described herein provide improved apparatus and methods for calibrating one or more cameras. The apparatus and methods can be performed automatically. These examples enable camera calibration to be performed based on calibration-enabling data that is derived from image features extracted from a reference image and rendering parameters specifying a physical rendering of the reference image, where the physical rendering of the reference image constitutes a calibration target that may be used to calibrate one or more cameras. In this regard, each camera may be calibrated based on the calibration-enabling data and one or more images of the calibration target that are captured by the camera. In these examples, there is no need for a complex or expensive calibration setup based on structured calibration patterns. Instead, natural features of any type of image may be used for camera calibration. The calibration process may leverage knowledge of the physical rendering dimensions of the reference image to reduce the computational resources and memory resources that are needed to calibrate a camera. Due to their efficient use of processing and memory resources, these examples readily may be implemented in a wide variety of application environments, including embedded environments, which are subject to significant processing and memory constraints.

FIG. 1 shows an example of an image processing system 10 producing camera calibration-enabling data 12 based on a reference image data file 14, zero or more optional training image data files 16, and rendering information 18.

Each of the reference image and training image data files 14, 16 may be any type of electronic data file that specifies (or describes) a respective image, which may be a complete or a partial version of any type of digital or electronic image, including: an image that was captured by an image sensor (e.g., a video camera, a still image camera; or an optical scanner) or a processed (e.g., filtered, reformatted, enhanced or otherwise modified) version of such an image; a computer-generated bitmap or vector graphic image; a textual image (e.g., a bitmap image containing text); and an iconographic image. Each of the electronic data files specifies a respective one of the reference and training images in a respective coordinate space (e.g., an image forming element space defining locations of image forming elements in terms of rows and columns).

Figure 2:
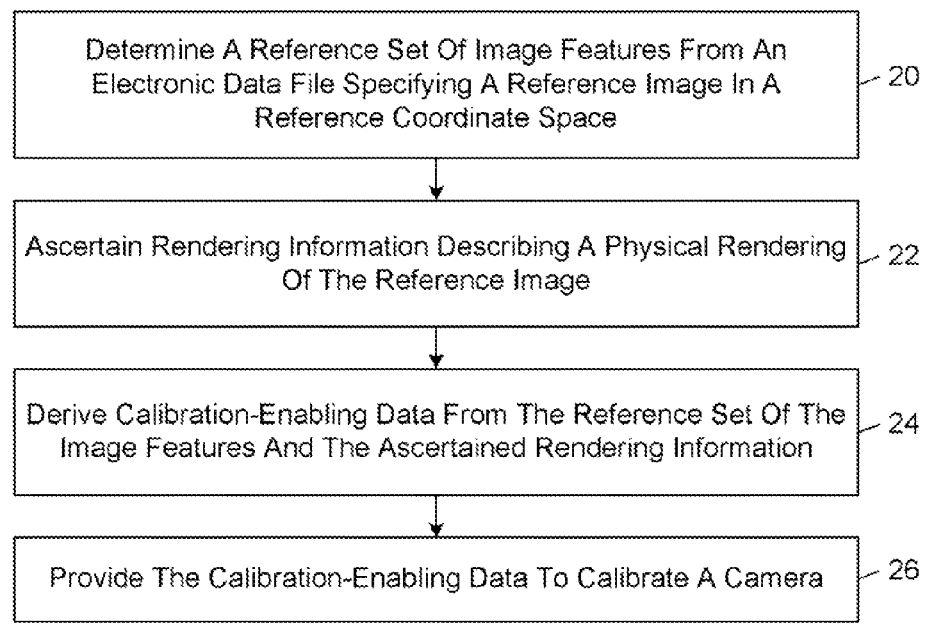
FIG. 2 is a flow diagram of an example of a camera calibration enabling method.

FIG. 2 shows an example of a camera calibration enabling method that is implemented by the image processing system 10 for the case in which there are no training images. In accordance with the method of FIG. 2, the image processing system 10 determines a reference set of image features from the electronic data file 14, which specifies the reference image in a reference coordinate space (FIG. 2, block 20). The image processing system 10 ascertains rendering information that describes a physical rendering of the reference image 14 from the rendering information 18 (FIG. 2, block 22). The image processing system 10 derives the calibration-enabling data 12 from the reference set of the image features and the ascertained rendering information (FIG. 2, block 24). The image processing system 10 provides the calibration-enabling data to calibrate a camera (FIG. 2, block 26).

The determination of a reference set of image features is described. In some examples of the method of FIG. 2, the process of determining the reference set of image features involves applying interest region detectors to the reference image in order to detect interest regions in the reference image and, for each of the detected interest regions, applying local descriptors to the detected interest region in order to determine a respective feature vector $\vec{V}_R = (d_1, \ldots, d_n)$ of local descriptor values $d_j$ characterizing the detected interest region j.

Any of a wide variety of different interest region detectors may be used to detect interest regions in the reference and training images. In some examples, the interest region detectors are affine-invariant interest region detectors (e.g., Harris corner detectors, Hessian blob detectors, principal curvature based region detectors, and salient region detectors).

Any of a wide variety of different local descriptors may be used to extract the local descriptor values, including distribution based descriptors, spatial-frequency based descriptors, differential descriptors, and generalized moment invariants. In some examples, the local descriptors include a scale invariant feature transform (SIFT) descriptor and one or more textural descriptors (e.g., a local binary pattern (LBP) feature descriptor, and a Gabor feature descriptor).

In some examples, the image processing system 10 applies an ordinal spatial intensity distribution (OSID) descriptor to the reference and training images to produce respective ones of the local descriptor values. The OSID descriptor is obtained by computing a 2-D histogram in the intensity ordering and spatial sub-division spaces, as described in F. Tang, S. Lim, N. Chang and H. Tao, "A Novel Feature Descriptor Invariant to Complex Brightness Changes," CVPR 2009 (June 2009). By constructing the descriptor in the ordinal space instead of raw intensity space, the OSID descriptors are invariant to any monotonically increasing brightness changes, improving performance even in the presence of image blur, viewpoint changes, and JPEG compression. In some examples, the image processing system 10 first detects local feature regions in an image using, for example, a Hessian-affine region detector, which outputs a set of affine normalized image patches. An example of a Hessian-affine region detector is described in K. Mikolajczyk et al., "A comparison of affine region detectors," International Journal of Computer Vision (IJCV) (2005). The image processing system 10 applies the OSID descriptor to the detected local feature regions to extract the OSID descriptor values from the image. This approach makes the resulting image features robust to view-point changes.

In some examples, the image descriptors also include shape-based descriptors. An example type of shape-based descriptor is a shape descriptor that describes a distribution over relative positions of the coordinates on a detected region shape using a coarse histogram of the coordinates of the points on the shape relative to a given point on the shape. Addition details of the shape descriptor are described in Belongie, S.; Malik, J. and Puzicha, J., "Shape matching and object recognition using shape contexts," In *IEEE Transactions on Pattern Analysis and Machine Intelligence*, volume 24(4), pages 509-522 (2002).

In the example shown in FIG. 2, the image processing system 10 produces the camera calibration-enabling data 12 independently of any of the training image data files 16. In other examples, the image processing system 10 reduces the number of image features in the reference set based on an analysis of the image features in the reference set and image features that are extracted from one or more of the training images.

Figure 3:
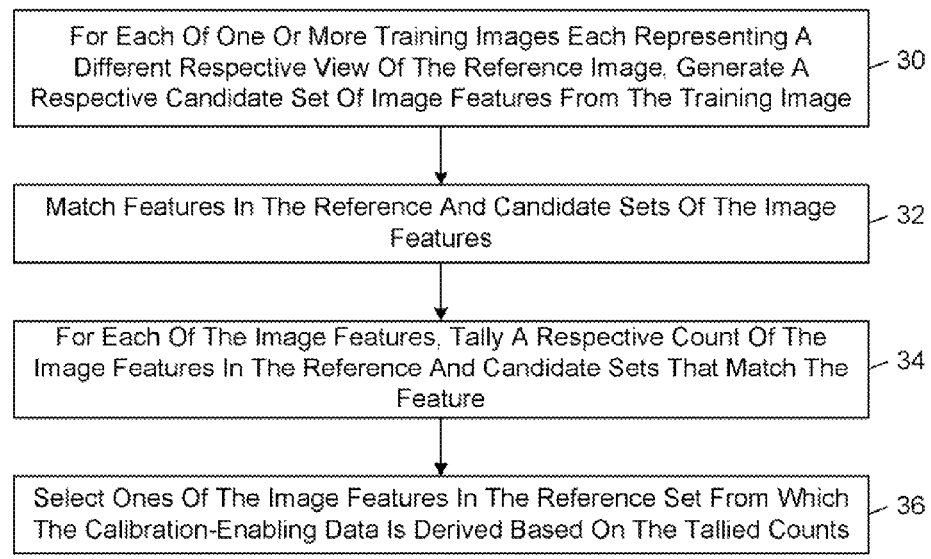
FIG. 3 is a flow diagram of an example of a method of determining image features from which camera calibration-enabling data may be derived.

FIG. 3 shows an example of a method by which the image processing system 10 may incorporate the training image data files 16 into the camera calibration-enabling data production method shown in FIG. 2. In this example, each of the training images represents a different respective view of the reference image. The different views may be generated by capturing training images of the reference image from different perspectives or by simulating the different views of the reference image using a computer simulation process.

In accordance with the method of FIG. 3, for each of the training images, the image processing system 10 generates a respective candidate set of image features from the training image (FIG. 3, block 30). The image processing system 10 matches features in the reference and candidate sets of the image features (FIG. 3, block 32). The image processing system 10 determines at least one metric that characterizes the matching image features in the reference and candidate sets (e.g., weighted average or estimated probabilities) and then selects ones of the image features in the reference set from which the calibration-enabling data is derived based on the determined metric. In one example, for each of the image features, the image processing system 10 tallies a respective count of the image features in the reference and candidate sets that match the feature (FIG. 3, block 34). The image processing system 10 selects ones of the image features in the reference set from which the calibration-enabling data is derived based on the tallied counts (FIG. 3, block 36).

The image processing system 10 typically generates a respective candidate set of image features from each of the training images (FIG. 3, block 30) using the same feature extraction process that was used to extract the image features from the reference image. In some examples, the image processing system 10 detects interest regions in each training image i using the same interest region detectors that were used to detect interest regions in the reference image and, for each of the detected interest regions, the image processing system 10 applies that same local descriptors that were applied to the interest regions detected in the reference image in order to determine a respective feature vector $\vec{V}_{Ti,j} = (d_1, \ldots, d_n)$ of local descriptor values $d_j$ characterizing the interest region j detected in the training image i.

The image processing system 10 may match features in the reference and candidate sets of the image features (FIG. 3, block 32) in a variety of different ways.

In some examples, the image processing system 10 individually compares each of the image features in the reference set to the image features in each of the candidate sets to determine a final set of matches for each of the image features in the reference set.

Figure 4:
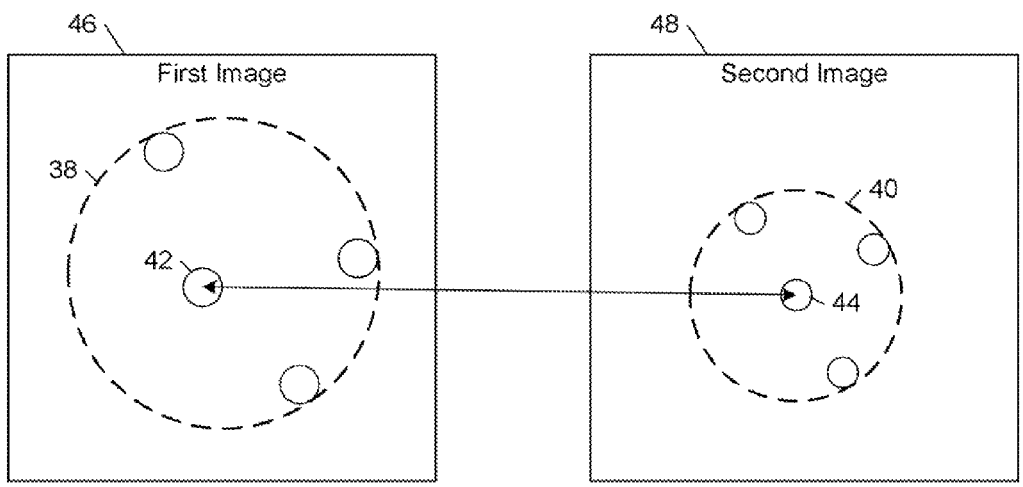
FIG. 4 shows examples of image features in a reference image and a captured image.

In other examples, the image processing system 10 determines candidate matches of the image features for each pair of the reference and training images and then prunes the list of candidate matches to obtain a final set of matched image features. In these examples, the image processing system 10 determines the candidate matches based on bipartite graph matching of the image features of a first image to respective ones of the image features of the second image. In this process, each image feature from the first image is matched against all image features from the second image independently. The result is an initial set of candidate matches from feature sets S and D, where $S=\{f_1^s, f_2^s, \ldots, f_{Ns}^s\}$ and $D=\{f_1^d, f_2^d, \ldots, f_{Nd}^d\}$. The matches initially generated with bipartite matching are denoted as $M=\{\{f_i^s, f_j^d\}, 1 \le i \le Ns, 1 \le j \le Nd\}$. In some of these examples, the image processing system 10 prunes the initial set of candidate matches based on the degree to which the local structure (represented by the nearest neighbor image features) in the neighborhoods of the local features of the candidate matches in the first and second images match. The image processing system 10 may use a fixed radius to define the local neighborhoods or it may define the neighborhoods adaptively by selecting a specified number (K) of the nearest neighbor local features closest to the local features of the candidate matches. The local structure/neighborhood of $f_i^s$ in feature set S is denoted $LS_i^s=\{f_{i1}^s, f_{i2}^s, \ldots, f_K^s\}$, which are the nearest K local features in S to the feature $f_i^s$. Similarly, the local structure of $f_j^d$ in feature set D is denoted $LS_j^D=\{f_{j1}^d, f_{j2}^d, \ldots, f_K^d\}$. The image processing system 10 prunes the set of candidate matches by comparing the local structures $LS_i^S$ and $LS_j^D$. If there is sufficient match between the local structures of a given candidate local feature in the first and second images, then the candidate match is designated as a true match; otherwise the candidate match is designated as a non-match and is pruned from the set. FIG. 4 shows an example of a pair of adaptively defined neighborhoods 38, 40 of candidate matching local features 42, 44 in first and second images 46, 48. In this example, the neighborhoods are defined by the three nearest local features (i.e., K=3). Depending on the degree of match between the nearest neighbor features of the local feature 42 and the nearest neighbor features of the matching local feature 44, the candidate match consists of the local features 42, 44 will declared a true match or a non-match.

For each of the image features in the reference set, the image processing system 10 may tally a respective count of the matches in the final set of matches (FIG. 3, block 34) and prune ones of the image features from the reference set based on the tallied counts (FIG. 3, block 36). In some examples, the image processing system 10 analyzes the final sets of matched features statistically (e.g., by performing a histogram analysis or a clustering analysis) in order to determine the final set of the most frequent (or popular) image features that will remain in the reference set for use in deriving the calibration-enabling data 12.

A system and a method for ascertaining rendering information is described. As explained above, the rendering information 18 may be any type of data that defines a physical rendering of the reference image. Example types of rendering information 18 include one or both of the physical dimensions of the physical rendering of the reference image (e.g., the height and width of a printout of the reference image on a planar sheet medium, such as paper), color data describing the colors of the image forming elements of the reference image, and data from which the parameters (e.g., spatial and color parameters) of a process for rendering the reference image can be determined.

In some examples, the image processing system 10 ascertains the rendering information from a request, command, or specification for rendering the reference image. In some cases, a rendering request or command (e.g., a print request) may be generated by a user or a client device. In some cases, a rendering specification may be generated by a computer process (e.g., an application program or a component of a computer operating system).

In other examples, the image processing system 10 ascertains the rendering information from a set of one or more rendering specifications for rendering the reference image onto one or more respective physical objects (e.g., a planar sheet of paper or a three-dimensional object, such as a coffee mug). The rendering specifications typically describe the physical dimensions (e.g., width and height) of the rendered reference image and may include a description of the physical dimensions of the physical objects (e.g., as appropriate: width, height, length, curvature, shape, and diameter).

Following are a system and a method for deriving calibration-enabling data. As explained above, the calibration-enabling data 12 may be any type of data that may be used to calibrate a camera, either geometrically, photometrically, or both geometrically and photometrically. Examples of calibration-enabling data include data describing image features at different locations in the reference image and data describing the geometric characteristics, the photometric characteristics, or both the geometric characteristics and the photometric characteristics of the physical rendering of the reference image.

In some examples, the calibration-enabling data may include the final set of reference image features, the respective locations (e.g., the image forming element locations) of these reference image features in the reference coordinate space of the reference image, the color (e.g., the color component values) of the image forming elements of the reference image, and the ascertained rendering information.

In some examples, the elements of the calibration-enabling data may be integrated into a common data structure (e.g., an extended markup language (XML) data structure). In other examples, the elements of the calibration-enabling data may be embodied in separate data structures that are linked by internal references (e.g., pointers); these separate data structures may be stored or transmitted together or separately.

Figure 5:
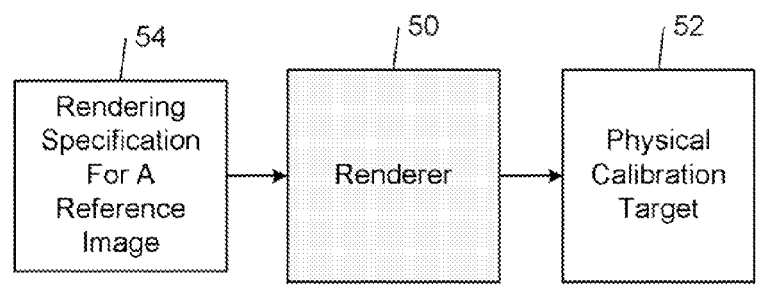
FIG. 5 is a block diagram of an example of a renderer producing a physical calibration target based on a rendering specification for a reference image.

A system and a method for producing a physical rendering of the reference image are described. FIG. 5 shows an example of a renderer 50 producing a physical calibration target 52 based on a rendering specification 54 for a reference image.

The renderer 50 may be any type of device that can actualize or create a physical example of the reference image. In some examples, the renderer 50 is a printer that can create a physical image on a surface (e.g., a planar surface or a three-dimensional surface) of a physical object (e.g., a sheet of a print medium, such as paper or fabric, a billboard, a coffee mug, or other physical image supporting object). In other examples, the renderer 50 is an image projector that can project a light image onto a surface (e.g., a planar surface or a three-dimensional curved surface) of a physical object (e.g., a sheet, a wall, a billboard, or other light-reflecting object).

The resulting physical calibration target 52 may be used to calibrate one or more cameras based on the calibration-enabling data and one or more images of the calibration target that are captured by the camera.

Figure 6:
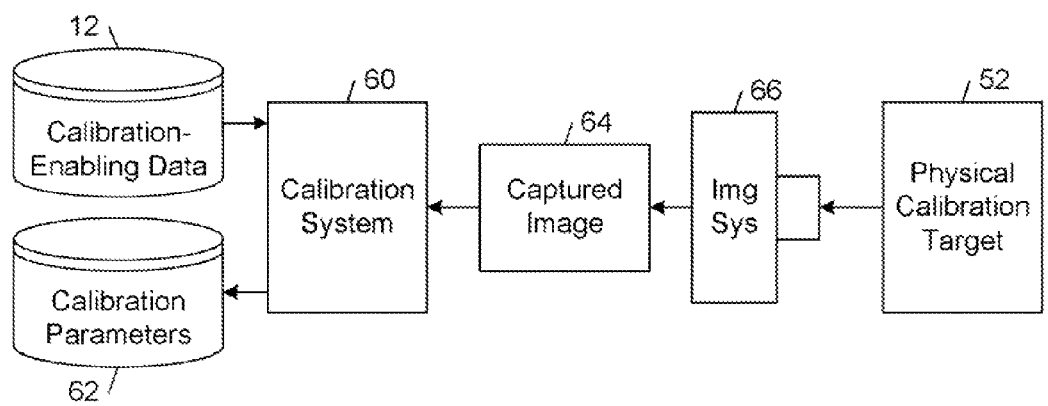
FIG. 6 is a block diagram of an example of a calibration system producing camera calibration parameters based on camera calibration-enabling data and an image captured by an example of an imaging system.

Calibration of a camera is described. FIG. 6 is a block diagram of an example of a calibration system 60 producing camera calibration parameters 62 based on camera calibration-enabling data 12 and an image 64 of the physical calibration target 52 that was captured by an imaging system 66. The calibration system 60 typically is implemented by one or more discrete data processing components (or modules) that are not limited to any particular hardware, firmware, or software configuration. The imaging system 66 typically includes an image sensor (e.g., a CCD image sensor or a CMOS image sensor) and an optical lens. In this example, the calibration system 60 and the imaging system 66 may be components of the same device (e.g., a digital still image camera, a digital video camera, or a computer device, such as a mobile telephone or a mobile computer) or they may be components of different devices.

The calibration system 60 processes the captured image 64 to determine one or more image features characterizing the captured image 64. In some examples, the calibration system 60 generates a respective set of image features from the captured image 64 using the same feature extraction process that was used to extract the image features from the reference image. In some examples, the calibration system 60 detects interest regions in the captured image 64 using the same interest region detectors that were used to detect interest regions in the reference image and, for each of the detected interest regions, the calibration system 60 applies the same local descriptors that were applied to the interest regions detected in the reference image in order to determine a respective feature vector $\vec{V}_{CI}=(d_1,\ldots,d_n)$ of local descriptor values $d_j$ characterizing the interest region j detected in the captured image CI.

The calibration system 60 may calibrate the imaging system 66 by determining one or more of the internal parameters and the external parameters of the imaging system based on a correspondence mapping between the image features in the captured image and the image features described in the calibration-enabling data 12. The calibration system 60 may use any of a wide variety of different camera calibration processes to determine these camera parameters (see, e.g., Hartley et al., "Multiple View Geometry in Computer Vision," Second Edition, Cambridge University Press, 2003).

In some examples, the calibration system 60 may leverage knowledge of the physical dimensions specified for rendering the reference image to reduce the computational resources and memory resources that are needed to calibrate a camera. For example, with knowledge of the physical dimensions of the rendered reference image and the shape of surface of the calibration target 52 on which the reference image is rendered, the calibration system 60 may parameterize the estimated correspondence mapping, thereby densifying the point correspondences.

In examples in which the reference image is rendered on a planar surface, the homography $H=[h_k]$ can be determined using linear least squares with the pairwise correspondences between the pixel locations of the image features in the reference image (i.e., $P_r(j,i)=(x_{ji},y_{ji})$) and the pixel locations of the image features in the captured image (i.e., $P_c(j,i)=(u_{ji},v_{ji})$), as follows:

$$\begin{bmatrix} u_{ji} \\ v_{ji} \\ 1 \end{bmatrix} = \begin{bmatrix} h_1 & h_2 & h_3 \\ h_4 & h_5 & h_6 \\ h_7 & h_8 & h_9 \end{bmatrix} \cdot \begin{bmatrix} x_{ji} \\ y_{ji} \\ 1 \end{bmatrix} \quad (1)$$

with $h_9$ assumed to be 1. Additionally, outlier rejection is performed to help improve robustness.

In other examples, more general 3-D models may be used to fit the correspondences to support other shapes and deformations of the surface on which the reference image is rendered.

In some examples, the calibration system 60 may compute a color transformation between the two spaces based on the correspondence mapping between the imaging system coordinate space and the reference coordinate space reference image color information described in calibration-enabling data 12. Assuming spatial invariance, the color transformation may be represented by a single linear 3×4 matrix to transform from the coordinate space of the imaging system 66 to that of the reference image coordinate space. In these examples, the captured image 64 is transformed into the reference coordinates using the inverse mapping (e.g., $H^{-1}$ for planar surfaces) to obtain an estimate of the reference image. In order to reduce the effect of noise and artifacts, local neighborhoods around the centroids of each warped image feature can be used. Such sampling also increases the robustness to registration and measurement errors. The calibration system 60 relates each captured image pixel $(R_c,G_c,B_c)$ after gamma correction to its expected reference color $(R_r,G_r,B_r)$ by an affine color transformation matrix $C=[c_k]$ given by $$\begin{bmatrix} R_c \\ G_c \\ B_c \end{bmatrix} = \begin{bmatrix} c_1 & c_2 & c_3 \\ c_4 & c_5 & c_6 \\ c_7 & c_8 & c_9 \end{bmatrix} \cdot \begin{bmatrix} R_r \\ G_r \\ B_r \end{bmatrix} \quad (2)$$

The matrix C is computed using linear least squares with outlier rejection. In other examples, a more sophisticated color model may be used for more accurate adaptation. In some examples, points that deviate significantly from the predicted pixel intensities are masked off and are considered to be occluders, thereby creating an occlusion mask as a byproduct. Because of possible demosaicing artifacts, some examples of the calibration system 60 may filter the mask to improve the final result.

The correspondence mapping information that can be determined based on the calibration-enabling data may be used in a wide variety of different applications. For example, in some examples, one or more cameras may be used to capture respective images of the calibration target and these images may be used to determine correspondence mappings between the respective capture plane coordinate systems of the cameras to a common coordinate system based on the calibration-enabling data. The resulting correspondence mapping information may be used by to synthesize synthetic views of a scene. In addition, in implementations in which calibration parameters have been determined, the calibration parameters may be used to convert the correspondence mapping information into 3-D information, which in turn may be used to create three-dimensional models of the scene.

Following is a description of example operating environments. Examples of each of the image processing system 10, the calibration system 60, and the imaging system 66 may be implemented by one or more discrete modules (or data processing components) that are not limited to any particular hardware, firmware, or software configuration. In the illustrated examples, these modules may be implemented in any computing or data processing environment, including in digital electronic circuitry (e.g., an application-specific integrated circuit, such as a digital signal processor (DSP), and graphics-accelerated hardware (GPU)) or in computer hardware, firmware, device driver, or software. In some examples, the functionalities of the modules are combined into a single data processing component. In some examples, the respective functionalities of each of one or more of the modules are performed by a respective set of multiple data processing components.

The modules of each of the processing system 10, the calibration system 60, and the imaging system 66 may be co-located on a single apparatus or they may be distributed across multiple apparatus; if distributed across multiple apparatus, these modules and the display 24 may communicate with each other over local wired or wireless connections, or they may communicate over global network connections (e.g., communications over the Internet).

In some implementations, process instructions (e.g., machine-readable code, such as computer software) for implementing the methods that are executed by the examples of each of the processing system 10, the calibration system 60, and the imaging system 66, as well as the data they generate, are stored in one or more computer-readable media.

As explained above, the image processing system 10 provides the calibration-enabling data 12 to calibrate a camera (FIG. 2, block 26).

In some examples, the image processing system 10 and an imaging system are sub-components of a single unitary device (e.g., a digital still image camera, a digital video camera, or a computer device, such as a mobile telephone or a mobile computer). In these examples, the image processing system 10 may provide the calibration-enabling data 12 by storing the data on a computer-readable medium of the device. The stored calibration-enabling data may be retrieved by the component of the device that calibrates the imaging sub-system. The imaging sub-system calibration may be performed by the image processing system 10 or some other component of the device.

Figure 7:
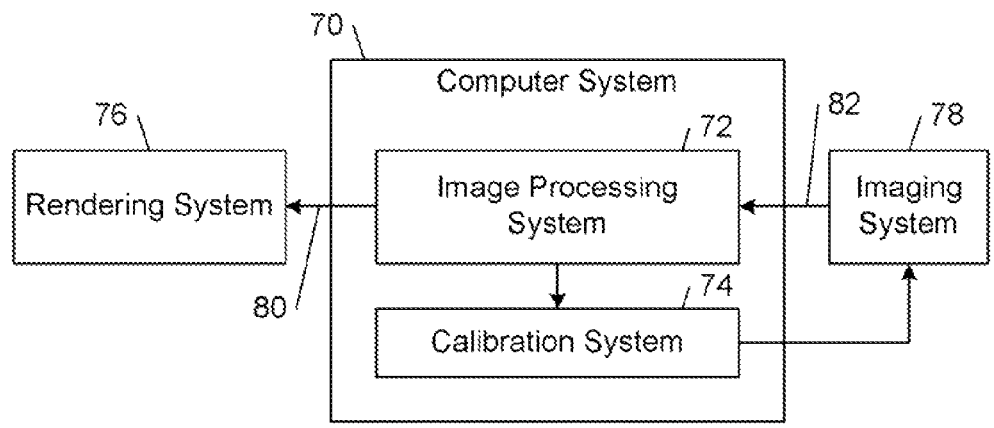
FIG. 7 is a block diagram of an example of a computer system that includes an image processing system and a camera calibration system.

FIG. 7 shows an example of a computer system 70 that includes an example 72 of the image processing system 10 and an example 74 of the calibration system 60. In this example, the image processing system 72 performs the functions of the image processing system 10 and the image feature extraction functions of the calibration system 60, and the calibration system 74 performs the calibration functions of the calibration system 60. For example, the image processing system 72 may extract image features from the reference and zero or more training images and an image 82 captured by an example 78 of the imaging system 66, and the calibration system 74 may perform geometric and color calibration of the imaging system 78 based on the reference set of image features and the image features extracted from the captured image 82. The image processing system 72 also may pass rendering instructions 80 to an example 76 of the renderer 50, where the rendering instructions 80 include a rendering specification for the reference image. The rendering system 76, in turn, may create a physical rendering of the reference image in accordance with the rendering specification to create a calibration target.

Figure 8:
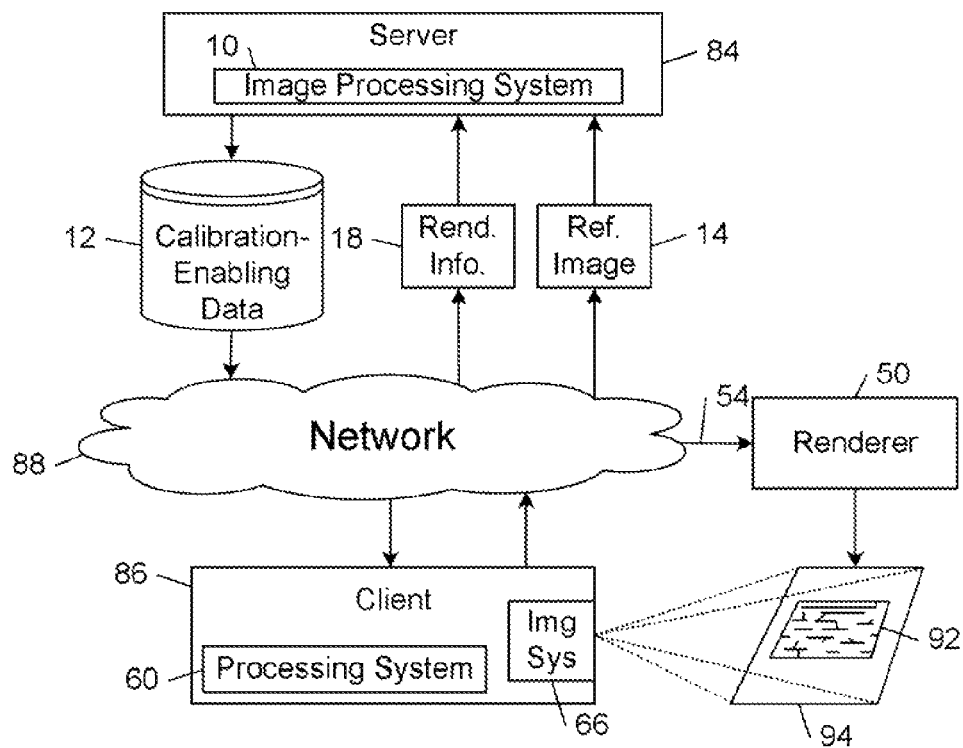
FIG. 8 is a block diagram of an example of a server that can be used to produce calibration-enabling data and an example of a client that includes an imaging system and a calibration system that can calibrate the imaging based on the calibration-enabling data.

In other examples, the image processing system 10 and the imaging system 66 are components of different respective devices. For example, in the example shown in FIG. 8, the image processing system 10 is a component of a server computer 84 and the imaging system 66 and the calibration system 60 are components of a client device 86 (e.g., a digital still image camera, a digital video camera, or a computer device, such as a mobile telephone or a mobile computer). In this example, the image processing system 10 generates the calibration-enabling data 12 based on the rendering information 18 and the reference image data file 14, which may be received from the client device 86 through a network connection over a network 88. The image processing system may provide the calibration-enabling data 12 by transmitting the calibration-enabling data 12 to the client device 86 through the same or a different network connection over the network 88. The renderer 50 may produce a physical calibration target 94 carrying a physical realization 92 of the reference image 14 based on the rendering specification 54, which may be received from the client device 86 through a network connection over the network 88.

In general, examples of the image processing system 10 may be implemented in any one of a wide variety of electronic devices, including desktop computers, workstation computers, server computers, and portable electronic devices (e.g., mobile phones, laptop and notebook computers, digital still image cameras, digital video cameras, and personal digital assistants).

Figure 9:
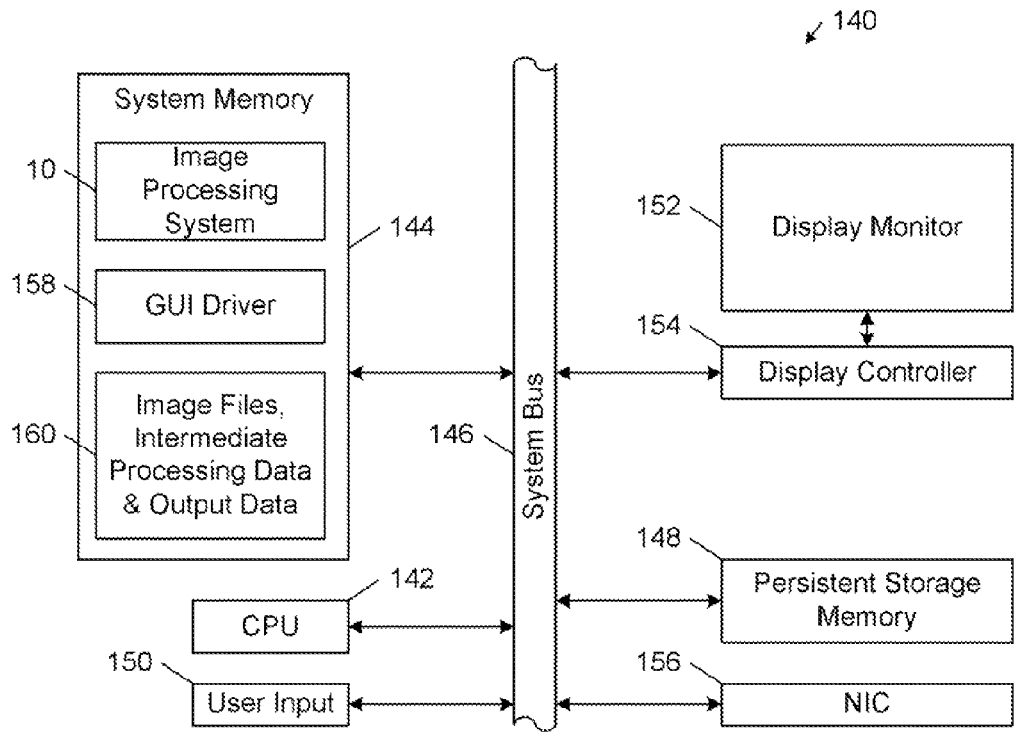
FIG. 9 is a block diagram of an example of an example computer system.

FIG. 9 shows an example of a computer system 140 that can implement any of the examples of the image processing system 10 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer 140 using one or more input devices 150 (e.g., a keyboard, a computer mouse, a microphone, joystick, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (NIC) 156.

As shown in FIG. 9, the system memory 144 also stores the image processing system 10, a graphics driver 158, and processing information 160 that includes input data, processing data, and output data. In some examples, the image processing system 10 interfaces with the graphics driver 158 (e.g., via a DirectX® component of a Microsoft Windows® operating system) to present a user interface on the display 151 for managing and controlling the operation of the image processing system 10.

Figure 10:
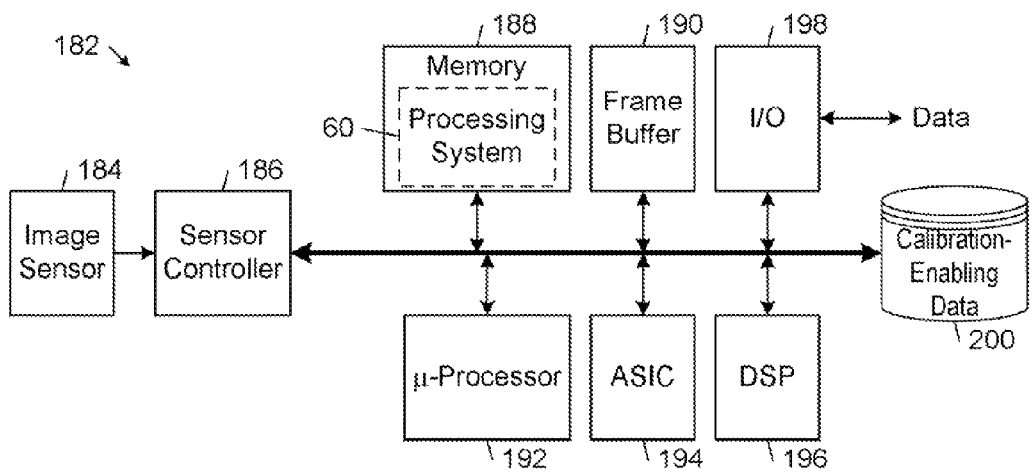
FIG. 10 is a block diagram of an example of an example camera.

FIG. 10 is a block diagram of an example of a digital camera system 182 that incorporates an example of the calibration system 60. The digital camera system 182 may be configured to capture one or both of still images and video image frames. The digital camera system 182 includes an image sensor 184 (e.g., a charge coupled device (CCD) or a complementary metal-oxide-semiconductor (CMOS) image sensor), a sensor controller 186, a memory 188, a frame buffer 190, a microprocessor 192, an ASIC (application-specific integrated circuit) 194, a DSP (digital signal processor) 196, an I/O (input/output) adapter 198, and a storage medium 200. The values that are output from the image sensor 184 may be, for example, 8-bit numbers or 12-bit numbers, which have values in a range from 0 (no light) to 255 or 4095 (maximum brightness). In general, the calibration system 60 may be implemented by one or more of hardware and firmware components. In the illustrated example, the calibration system 60 is implemented in firmware, which is loaded into memory 188. The storage medium 200 may be implemented by any type of image storage technology, including a compact flash memory card and a digital video tape cassette. The image data stored in the storage medium 200 may be transferred to a storage device (e.g., a hard disk drive, a floppy disk drive, a CD-ROM drive, or a non-volatile data storage device) of an external processing system (e.g., a computer or workstation) via the I/O subsystem 198.

The microprocessor 192 controls the operation of the digital camera system 182, including the processing of the image captured by the image sensor 184. The microprocessor 192 typically is programmed to perform various operations on the captured image, including one or more of the following operations: demosaicing; color correction based on calibration-enabling data stored in the storage medium 200; image compression; one or more storage operations; and one or more transmission operations.

The embodiments that are described herein provide improved apparatus and methods for calibrating one or more cameras.

Other embodiments are within the scope of the claims.

The invention claimed is:

1. A method, comprising:
   determining, by a system comprising a processor, a reference set of image features from an electronic data file specifying a reference image in a reference coordinate space;
   receiving, by the system, training images representing respective different views of the reference image;
   ascertaining, by the system, rendering information describing a physical rendering of the reference image;
   deriving, by the system, calibration-enabling data from the reference set of image features and the ascertained rendering information, the deriving comprising:
      for each respective training image of the training images, generating a respective candidate set of image features from the respective training image, and comparing the image features of the respective candidate set to the image features in the reference set,
      for each respective image feature in the reference set, computing a metric representing a number of matches to corresponding image features in the candidate sets, and
      selecting, based on the computed metrics, a subset less than all of the image features in the reference set, wherein the calibration-enabling data is derived using the selected subset less than all of the image features in the reference set; and
   providing, by the system, the calibration-enabling data to calibrate an imaging system.

2. The method of claim 1, wherein the generating comprises:
   for each respective training image of the training images, detecting interest regions in the respective training image, and
   for each respective interest region of the interest regions detected in the respective training image, applying a descriptor to the respective interest region.

3. The method of claim 1, wherein at least one of the reference and training images is a computer-generated synthetic image.

4. The method of claim 1, wherein the selecting comprises selecting the subset less than all of the image features in the reference set having highest metrics.

5. The method of claim 1, wherein the deriving comprises deriving the calibration-enabling data from:
   the selected subset less than all of the image features in the reference set,
   locations of the image features of the selected subset in the reference coordinate space, and
   size data specifying one or more dimensions of the physical rendering of the reference image.

6. The method of claim 5, wherein the deriving comprises deriving the calibration-enabling data from color data obtained from the reference image.

7. The method of claim 1, wherein the providing comprises sending the calibration-enabling data to another computer over a network.

8. The method of claim 1, further comprising calibrating the imaging system comprising a camera based on the calibration-enabling data and one or more images captured by the imaging system.

9. The method of claim 8, wherein the calibrating comprises:
   the imaging system capturing an image in relation to a capture coordinate space;
   extracting a set of the image features from the captured image;
   ascertaining matches between the image features in the extracted set and image features described by the calibration-enabling data; and
   determining a correspondence mapping between the capture coordinate space and the reference coordinate space based on the ascertained matches.

10. The method of claim 9, wherein the calibrating comprises at least one selected from among determining intrinsic calibration parameters of the imaging system based on the correspondence mapping, determining extrinsic calibration parameters of the imaging system based on the correspondence mapping, and color calibrating the imaging system based on the correspondence mapping.

11. The method of claim 1, wherein the training images are captured using at least one camera at respective different perspectives with respect to the reference image.

12. The method of claim 1, wherein the calibration-enabling data is derived from image features in the reference set without using any predefined calibration pattern in the reference image.

13. The method of claim 1, wherein selecting less than all of the image features in the reference set comprises:
    pruning at least one image feature from the reference set based on the computed metrics.

14. The method of claim 1, wherein the derived calibration-enabling data comprises data describing image features at different locations in the reference image and data describing geometric characteristics of the physical rendering.

15. At least one non-transitory computer-readable medium having computer-readable program code embodied therein, the computer-readable program code upon execution causing a computer to:
    determine a reference set of image features from an electronic data file specifying a reference image in a reference coordinate space;
    receive training images representing respective different views of the reference image;
    ascertain rendering information describing a physical rendering of the reference image;
    derive calibration-enabling data from the reference set of image features and the ascertained rendering information, the deriving comprising:
        for each respective training image of the training images, generating a respective candidate set of image features from the respective training image, and comparing the image features of the respective candidate set to the image features in the reference set,
        for each respective image feature in the reference set, computing a metric representing a number of matches to corresponding image features in the candidate sets, and
        selecting, based on the computed metrics, a subset less than all of the image features in the reference set, wherein the calibration-enabling data is derived using the selected subset less than all of the image features in the reference set; and
    provide the calibration-enabling data to calibrate an imaging system.

16. The at least one non-transitory computer-readable medium of claim 15, wherein the generating comprises:
    for each respective training image of the training images, detecting interest regions in the respective training image, and
    for each respective interest region of the interest regions detected in the respective training image, applying a descriptor to the respective interest region.

17. The at least one non-transitory computer-readable medium of claim 15, wherein the deriving comprises deriving the calibration-enabling data from:
    the selected subset less than all of the image features in the reference set,
    locations of the image features of the selected subset in the reference coordinate space, and
    size data specifying one or more dimensions of the physical rendering of the reference image.

18. A system comprising:
    a processor; and
    a storage medium storing instructions executable on the processor to:
        determine a reference set of image features from an electronic data file specifying a reference image;
        receive training images representing respective different views of the reference image;
        derive calibration-enabling data from the reference set of image features, the deriving comprising:
            for each respective training image of the training images, generating a respective candidate set of image features from the respective training image, and comparing the image features of the respective candidate set to the image features in the reference set,
            for each respective image feature in the reference set, computing a metric representing a number of matches to corresponding image features in the candidate sets, and
            selecting, based on the computed metrics, a subset less than all of the image features in the reference set, wherein the calibration-enabling data is derived using the selected subset less than all of the image features in the reference set; and
        provide the calibration-enabling data to calibrate an imaging system.

19. The system of claim 18, wherein the generating comprises:
    for each respective training image of the training images, detecting interest regions in the respective training image, and
    for each respective interest region of the interest regions detected in the respective training image, applying a descriptor to the respective interest region.

20. The system of claim 18, wherein the deriving comprises deriving the calibration-enabling data from:
    the selected subset less than all of the image features in the reference set, and
    locations of the image features of the selected subset in the reference coordinate space.

* * * * *